(12) United States Patent
Shitano et al.

(10) Patent No.: US 7,376,745 B2
(45) Date of Patent: May 20, 2008

(54) NETWORK ADDRESS GENERATING SYSTEM, NETWORK ADDRESS GENERATING APPARATUS AND METHOD, PROGRAM AND STORAGE MEDIUM

(75) Inventors: Masaki Shitano, Kanagawa (JP); Kazuomi Oishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 897 days.

(21) Appl. No.: 10/435,464

(22) Filed: May 12, 2003

(65) Prior Publication Data
US 2003/0236897 A1 Dec. 25, 2003

(30) Foreign Application Priority Data
May 15, 2002 (JP) ............................. 2002-140232
Feb. 12, 2003 (JP) ............................. 2003-034343

(51) Int. Cl.
*G06F 15/16* (2006.01)
(52) U.S. Cl. ...................... 709/229; 709/223; 709/225; 726/3; 726/13
(58) Field of Classification Search ........ 709/223–226, 709/227–229; 726/3–5, 18–1, 13
See application file for complete search history.

(56) References Cited

U.S. PATENT DOCUMENTS 6,779,118 B1 * 8/2004 Ikudome et al. ............... 726/7
6,792,474 B1 * 9/2004 Hopprich et al. ............ 709/245
6,801,528 B2 * 10/2004 Nassar ........................ 370/389
6,898,711 B1 * 5/2005 Bauman et al. ............. 713/185
7,069,330 B1 * 6/2006 McArdle et al. ............ 709/229
7,103,648 B1 * 9/2006 Burrows ..................... 709/220

OTHER PUBLICATIONS

S. Deering and R. Hinden. RFC 2460: Internet Protocol, Version 6 (IPv6) specification, Dec. 1998.*
RFC 2401, S. Kent et al., "Security Architecture for the Internet Protocol", Nov. 1998, pp. 1-59.
RFC 2373, R. Hinden et al., "IP Version 6 Addressing Architecture", Jul. 1998, pp. 1-22.
RFC 2461, T. Narten et al., "Neighbor Discovery for IP Version 6 (IPv6)", Dec. 1998, pp. 1-84.
RFC 3041, T. Narten et al., "Privacy Extensions for Stateless Address Autoconfiguration in IPv6", Jan. 2001, pp. 1-16.

* cited by examiner

*Primary Examiner*—Krisna Lim
*Assistant Examiner*—Brendan Y. Higa
(74) *Attorney, Agent, or Firm*—Fitzpatrick, Cella, Harper & Scinto

(57) ABSTRACT

An information processing system capable of appropriate precise access control is provided. The information processing system of this invention includes an access controller capable of data transmission/reception, and a computer system connectable to a network via the access controller. The computer system includes an acquiring unit for acquiring user identification information for identifying a user, and application identification information for identifying an application which accesses the network, and an adding unit for generating an IP address on the basis of the acquired user identification information and application identification information, and adding the IP address to data to be transmitted via the application. The access controller includes an access control unit for controlling access to the network on the basis of the IP address added to the transmitted data.

58 Claims, 14 Drawing Sheets

FIG. 5

| 501 | 500 | 502 |
|---|---|---|
| target | | discrimination |
| chat | | 0xFF01 |
| mam | | 0xEE00 |
| papa | | 0xEE01 |
| navigator | | 0xFF00 |
| ...... | | ...... |

FIG. 7

| 0x3ffe | 0x155 | 0x0 | 0x23 | 0xab | 0x1 | 0x0 | 0x1 |
|---|---|---|---|---|---|---|---|

| 0xFE | 0x80 | 0x0 | 0x0 | 0x0 | 0x0 | 0x0 | 0x0 | C1' | C2 | C3 | 0xFF | 0xFE | M1 | M2 | M3 |

F I G. 12

| 0xFF | 0x02 | 0x0 | 0x0 | 0x0 | 0x0 | 0x0 | 0x0 | 0x0 | 0x0 | 0x0 | 0x1 | 0xFF | M1 | M2 | M3 |

NETWORK ADDRESS GENERATING SYSTEM, NETWORK ADDRESS GENERATING APPARATUS AND METHOD, PROGRAM AND STORAGE MEDIUM

FIELD OF THE INVENTION

The present invention relates to an information processing technique using addresses of Internet Protocol version 6 (to be referred to as IPv6 hereinafter)

BACKGROUND OF THE INVENTION

With the spread of the Internet, the Internet infiltrates into people's lives, and at the same time negative factors such as damages caused by inappropriate information or computer viruses increase. In particular, a reduction in productivity and the problem of security management resulting from personal use of the Internet in enterprises are beginning to be pointed out in recent years. Examples are inappropriate access to Web sites during work time and an information leak by mail from inside companies to the outside. Also, in schools and the like, it is becoming necessary to limit Internet access, e.g., conceal harmful information on WWW (World Wide Web) from students or block unsolicited bulk mail and spam mail.

To solve such problems, techniques which limit Internet access by Internet filtering, i.e., software, conventionally exist. Representative techniques are a URL (Unique Resource Locator) check method and a rating/filtering method. In the former method, a URL list indicating permission or rejection of access to each URL is formed, and a URL requested by a user is compared with the URLs in the list, thereby controlling access to resources. In the latter method, Web pages are rated in accordance with predetermined standards, and access is controlled with reference to the result of rating.

Unfortunately, both the conventional techniques control access at a terminal which uses the Internet, i.e., perform the control by using URLs and external resources regardless of a user who uses the Internet.

Accordingly, it is impossible to control access for each user who uses the terminal or for each application, and set details of this access control.

SUMMARY OF THE INVENTION

The present invention has been made in consideration of the above situation, and has as its object to make appropriate precise access control possible.

To achieve the above object, an information processing apparatus according to the present invention has the following arrangement.

That is, an information processing system comprising a connecting device capable of data transmission/reception, and an information processing apparatus connectable to a network via the connecting device, characterized in that the information processing apparatus comprises acquiring means for acquiring user identification information for identifying a user, and application. identification information for identifying an application which accesses the network, and adding means for generating an IP address on the basis of the acquired user identification information and application identification information, and adding the IP address to data to be transmitted via the application, and the connecting device comprises access control means for controlling access to the network on the basis of the IP address added to the transmitted data.

Also, to achieve the above object, an information processing apparatus according to the present invention has the following arrangement.

That is, an information processing apparatus connectable to a network via a connecting device capable of access control on the basis of an IP address added to received data, characterized by comprising acquiring means for acquiring user identification information for identifying a user, and application identification information for identifying an application which accesses the network, and adding means for generating an IP address on the basis of the acquired user identification information and application identification information, and adding the IP address to data to be transmitted via the application.

Furthermore, to achieve the above object, a connecting device according to the present invention has the following arrangement.

That is, a connecting device for connecting an information processing apparatus capable of data transmission/reception to a network, characterized by comprising acquiring means for acquiring an IP address which is added to data transmitted from the information processing apparatus to identify a user who has transmitted the data or an application used to transmit the data, and access control means for controlling access to the network on the basis of the acquired IP address.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a conceptual view of a bind list owned by the computer forming the information processing system according to the embodiment of the present invention;

FIG. 7 is a conceptual view showing an IPv6 address used in the information processing system according to the embodiment of the present invention;

FIG. 11 is a view showing the arrangement of a tentative link-local address;

FIG. 12 is a view showing the arrangement of a solicited-node multicast address of the tentative link-local address;

DETAILED DESCRIPTION OF THE PREFERRED EMBODIMENTS

Preferred embodiments of the present invention will now be described in detail in accordance with the accompanying drawings.

First Embodiment

<Whole Configuration of System>

Figure 1:
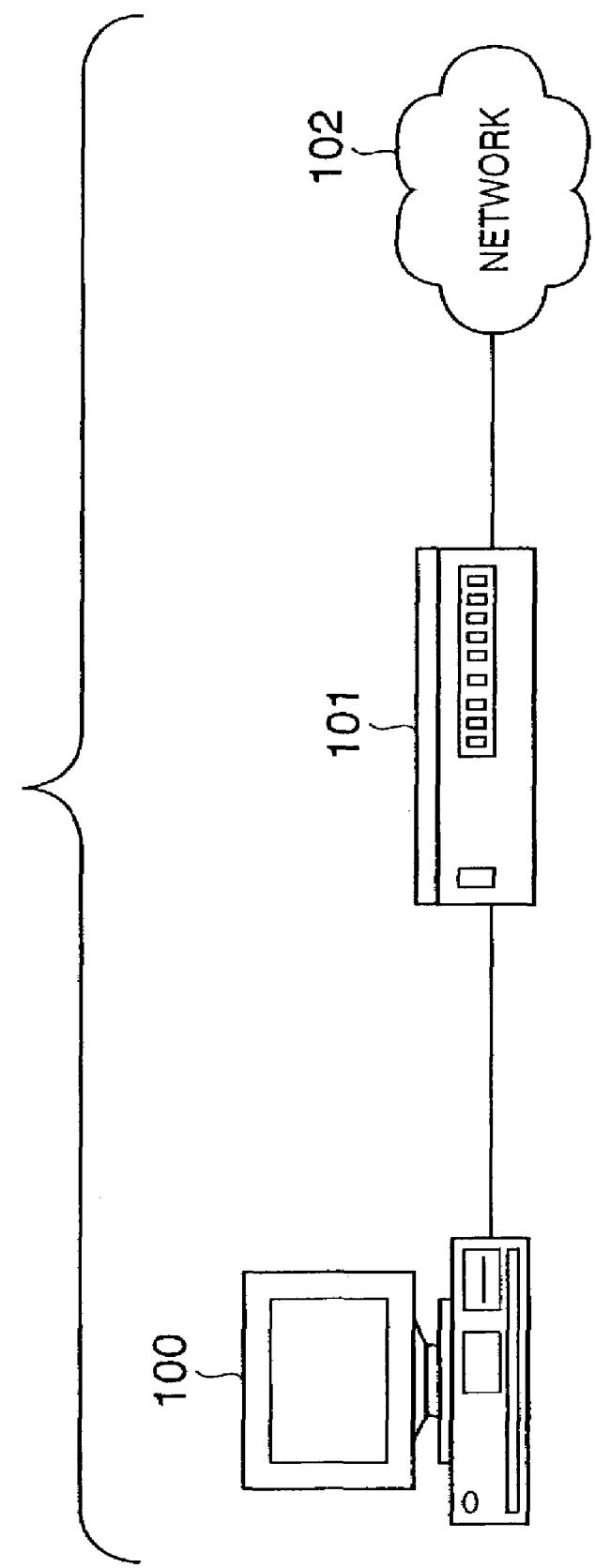
FIG. 1 is a view showing the configuration of an information processing system according to an embodiment of the present invention.

FIG. 1 is a view showing the whole configuration of an information processing system according to an embodiment of the present invention.

As shown in FIG. 1, in the information processing system of this embodiment, a computer system 100 (information processing apparatus) such as a PC (Personal Computer) and an access controller 101 (connecting device) are so connected as to be able to communicate with each other, and the access controller 101 is connected to an external network 102 such as the Internet. Note that the computer system 100 cannot connect to the external network 102 such as the Internet without the access controller 101.

The computer system 100 has various functions such as a function of browsing resources of the Internet, and includes a CPU, ROM, RAM, HDD, and the like.

The access controller 101 is a so-called router which relays data flowing on the network to another network, and has general functions presently being implemented as a router. The access controller 101 also has a function of managing access rules and controlling data flowing on the network on the basis of the access rules. In the embodiment shown in FIG. 1, the access controller 101 is implemented as a dedicated device. However, these functions of the access controller 101 can also be implemented by the computer system 100.

The network 102 is a segment network, e.g., an intranet or the Internet, to which no computer used by a user belongs.

To simplify the explanation, the embodiment of the present invention has one computer system 100. However, the present invention is similarly applicable even when a plurality of computer systems 100 are present in the same segment.

<Computer System Block Diagram>

Figure 2:
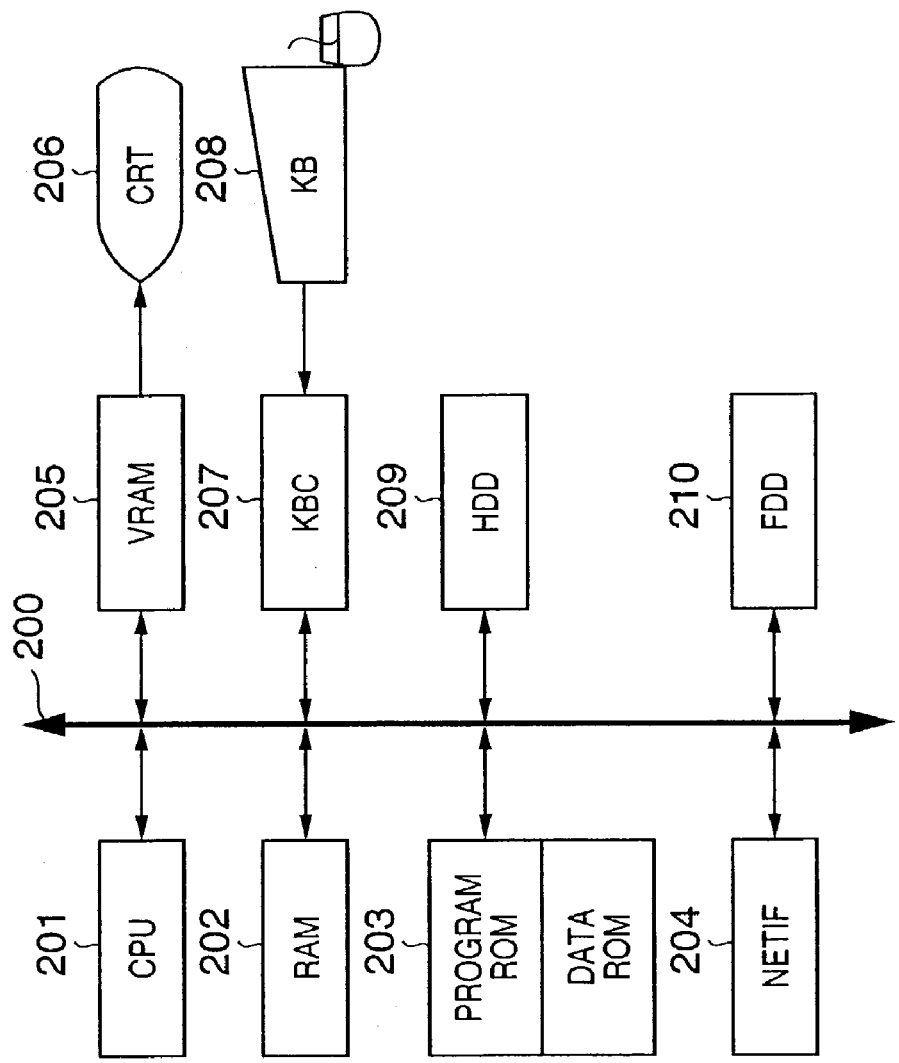
FIG. 2 is a system block diagram of a computer forming the information processing system according to the embodiment of the present invention.

FIG. 2 is a block diagram showing the configuration of the computer system 100 in the information processing system according to the embodiment of the present invention.

In FIG. 2, reference numeral 201 denotes a central processing unit (to be referred to as a CPU hereinafter) which controls the computer system.

Reference numeral 202 denotes a random access memory (to be referred to as a RAM hereinafter) which functions as a main memory of the CPU 201 and as an execute program area, an execute area of the program, and a data area.

Reference numeral 203 denotes a read only memory (to be referred to as a ROM hereinafter) which stores operation procedures of the CPU 201. The ROM 203 includes a program ROM which records basic software (OS) as a system program for controlling devices of this computer system, and a data ROM which records, e.g., information necessary to operate the system. Note that an HDD 209 (to be described later) is also used instead of the ROM 203 in some cases.

A network interface (NETIF) 204 controls data transfer between computer systems across the network, and diagnoses connection states.

A video RAM (VRAM) 205 rasterizes images displayed on the screen of a CRT 206 (to be described below) which shows the operating state of the computer system, and controls the display.

The display device 206 such as a display will be referred to as a CRT hereinafter.

A controller 207 controls input signals from an external input device 208.

The external input device 208 accepts operations which the user of the computer system performs on the computer system. The external input device 208 includes, e.g., a pointing device such as a mouse and a keyboard, and will be simply referred to as a KB hereinafter.

The hard disk drive (HDD) 209 is used to save application programs and data such as image information. In this embodiment, application programs are software programs for executing various processing means constructing this embodiment.

An external I/O device 210 is, e.g., a floppy (registered trademark) disk drive or CD-ROM drive which inputs and outputs a removable disk (registered trademark) The external I/O device 210 is used to read out the above-mentioned application programs from a medium, and will be simply referred to as an FDD hereinafter.

Note that the application programs and data stored in the HDD 209 can also be stored in the FDD 210.

An I/O bus (address bus, data bus, and control bus) 200 connects the individual units described above.

<Access Controller Block Diagram>

Figure 3:
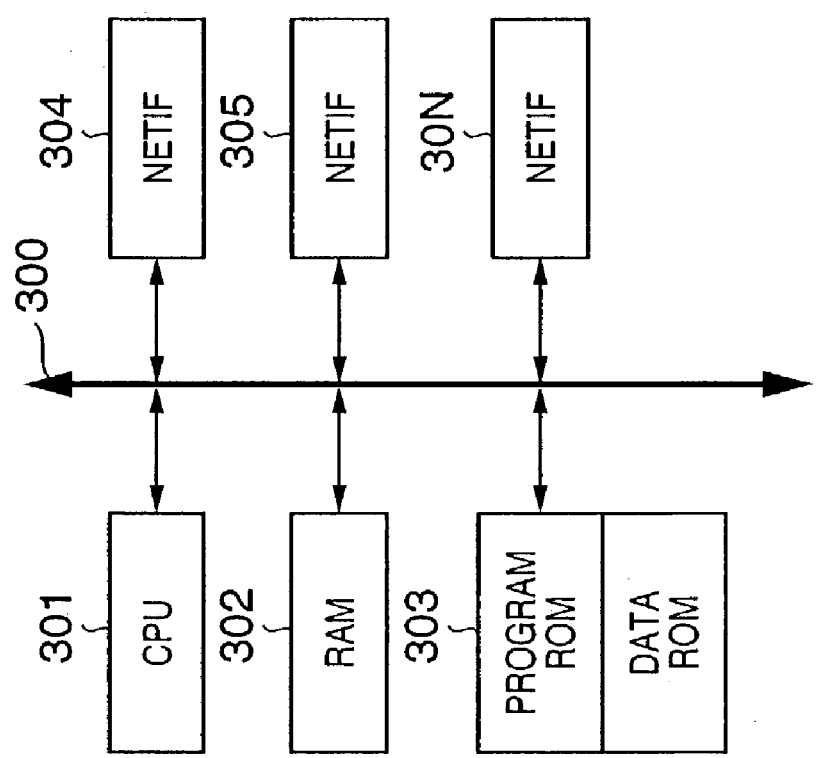
FIG. 3 is a block diagram of an access controller forming the information processing system according to the embodiment of the present invention.

FIG. 3 is a block diagram showing the arrangement of the access controller 101 in the information processing system according to the embodiment of the present invention.

When the functions of the access controller 101 are to be implemented by the computer system, the system block diagram is the same as the compute system 100, so an explanation thereof will be omitted.

In this embodiment, a system block diagram when the access controller 101 is installed as a dedicated device will be explained below with reference to FIG. 3.

Referring to FIG. 3, a central processing unit (to be referred to as a CPU hereinafter) 301 controls the access controller 101.

A random access memory (to be referred to as a RAM hereinafter) 302 functions as a main memory of the CPU 301 and as an execute program area, an execute area of the program, and a data area.

A read only memory (to be referred to as a ROM hereinafter) 303 stores operation procedures of the CPU 301. The ROM 303 includes a program ROM which records basic software (OS) as a system program for controlling internal units of the access controller, and a data ROM which records, e.g., information necessary to operate the system.

Network interfaces (NETIFs) 304, 305, and 30N control data transfer between a plurality of computer systems, and diagnose connection states.

An I/O bus (address bus, data bus, and control bus) 300 connects the individual units described above.

<Module Configurations and Functions>

Figure 4:
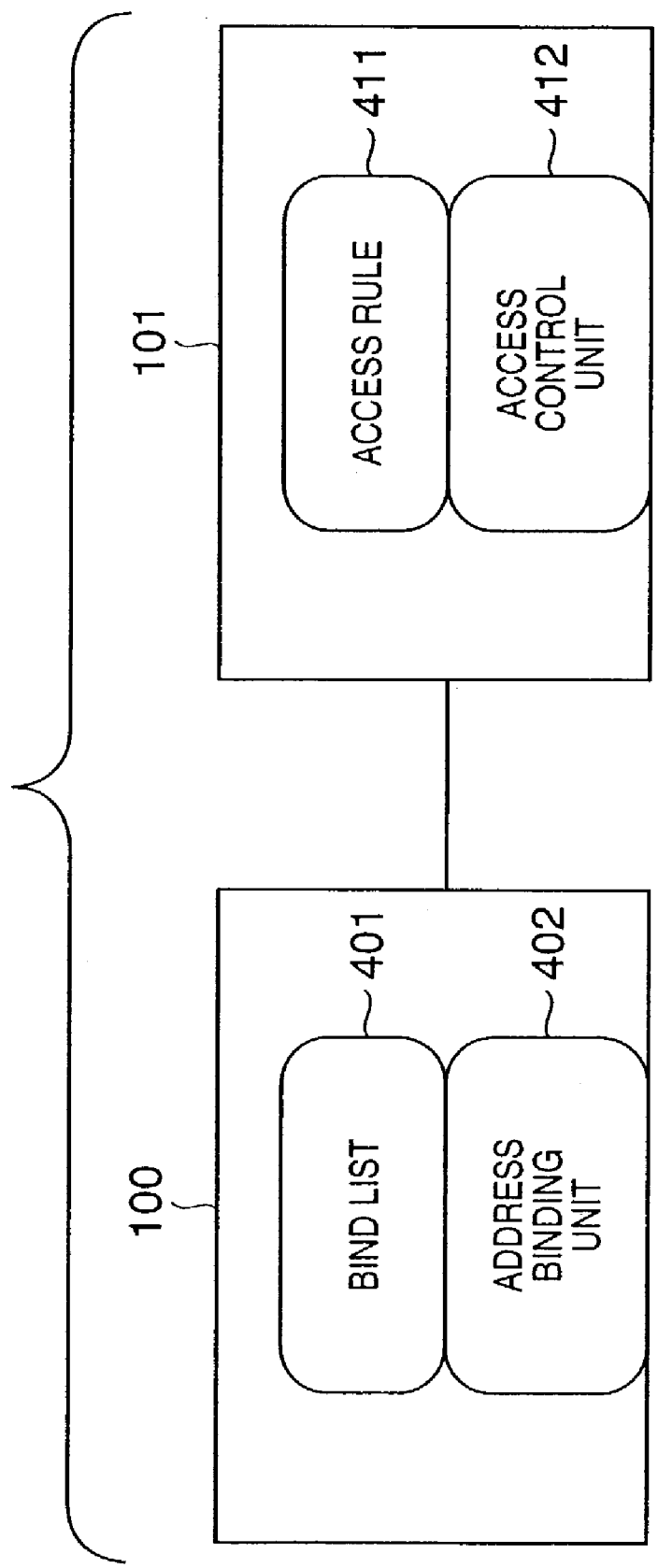
FIG. 4 is a view showing the module configuration of the information processing system according to the embodiment of the present invention.

Application modules in the computer system 100 and access controller 101 of the information processing system according to the embodiment of the present invention will be described below with reference to FIG. 4.

Note that the application modules to be described below are achieved by supplying a storage medium recording program codes of software for implementing the functions of the modules to a system or apparatus, and reading out and executing the program codes stored in the storage medium by a computer (or a CPU or MPU) of the system or apparatus.

In this case, the program codes read out from the storage medium implement the functions of this embodiment, and the storage medium storing these program codes constitutes the invention.

Also, besides the functions of this embodiment are implemented by executing the readout program codes by the computer, the present invention includes a case where an OS (Operating System) or the like running on the computer performs part or the whole of actual processing in accordance with designations by the program codes and thereby implements the functions of this embodiment.

Furthermore, the present invention also includes a case where the program codes read out from the storage medium are written in a memory of a function expansion board inserted into the computer or of a function expansion unit connected to the computer, and, in accordance with designations by the program codes, a CPU or the like of the function expansion board or function expansion unit performs part or the whole of actual processing and thereby implements the functions of this embodiment.

Referring back to FIG. 4, the computer system 100 has a bind list 401 and address binding unit 402.

The bind list 401 is a table for managing the relation between a user who logs in to the computer system 100, an application used, and identification information. To this table, it is possible to perform search for uniquely specifying a user, application, and identification information. Read, write, addition, and deletion can also be performed.

The address binding means 401 has a function of performing search, read, write, addition, or deletion of certain information with respect to the bind list 401; a function of identifying a present log-in user; and a function of generating an IP address from identification information and limiting the use of a specific address with respect to all applications accessing the IP network.

The access controller 101 has an access rule 411 and access control unit 412.

The access rule 411 describes logic which determines, on the basis of identification information, whether to relay data flowing on the network to another network or to reject the data. Read, write, addition, and deletion can be performed for the access rule 411.

The access control unit 412 has a function of performing search, read, write, addition, or deletion of certain information with respect to the access rule 411; a function of acquiring the identification information from an IP address; a function of relaying data flowing on the network to another network or rejecting the data in accordance with the result of determination performed using the access rule on the basis of identification information; a function of analyzing a partial protocol of a network layer (third layer) or transport layer (fourth layer) in an OSI reference model, and performing transfer or rejection; a route selecting function of selecting a data transfer route by determining the address of the network layer; and a function of discarding all data except for a protocol to which the access control unit 412 corresponds.

<Bind List>

FIG. 5 is a schematic view of the bind list 401 owned by the computer system which forms the information processing system according to the embodiment of the present invention.

A bind list 500 has two items, i.e., a target item 501 and identification item 502.

The bind list 500 allows search, read, write, addition, and deletion for each individual item. The identification item 502 is uniquely specified for the target item 501.

The target item 501 stores the ID of a user who logs in to the computer system 100, or an application name.

The identification item 502 stores identification information. An IPv6 address which the computer system 100 uses in the IP network is generated from these pieces of identification information.

<Flow of System Processing>

The flow of processing of the whole information processing system according to the embodiment of the present invention will be described below. When processing is to be executed in the information processing system according to this embodiment, two setting operations explained below are performed for the system in advance.

First, a user who logs in to the computer system 100, identification information of the user, and identification information of an application are set for the computer system 100 by using the address binding unit 402. The set pieces of information are stored in the bind list 401.

Second, information (logic for determining, on the basis of identification information, whether to relay data flowing on the network to another network or to reject the data) is set by using the access control unit 412 via the computer system 100 or directly if the access controller 101 is the computer system. The set information is stored in the access rule 411.

The flow of processing in the computer system 100 will be described first.

When the user logs in to the computer system 100, the address binding unit 402 acquires the log-in user name (user ID) from the OS (Operating System).

By using the acquired log-in user name as a key, the address binding unit 402 acquires identification information 1 (identification information used by the log-in user) from the bind list 401 and holds identification information 1.

Next, the user activates an application such as a network browser for browsing resources on the Internet. Simultaneously with this activation, the address binding unit 402 acquires the application name from the OS.

By using the acquired application name as a key, the address binding unit 402 acquires identification information 2 (identification information of the application) from the bind list 401, and holds identification information 2.

On the basis of identification information 1 held beforehand and identification information 2, the address binding unit 402 generates an IP address and transfers this IP address to the application. The application adds the IP address to an IP header field of transmission data, and uses this IP address as a transmission source address.

The user accesses a desired Internet resource by using the application. In this case, data transmitted from the application to the NETIF 204 is always transmitted to the external network 102 via the access controller 101.

The flow of processing in the access controller 101 when the data transmitted from the NETIF 204 is received by the access controller 101 will be explained below.

The access control unit 412 acquires the data received by the access controller 101, i.e., the data transmitted from the computer system 100.

The access control unit 412 acquires the transmission source IP address from the IP header field of the acquired data, and extracts the identification information from the acquired transmission source IP address.

On the basis of the extracted identification information, the access control unit 412 controls access to the external network. That is, the access control unit 412 compares the identification information with the access rule 411. If determining that access is to be permitted, the access control unit 412 transmits the data to the external network 102.

If determining that access is to be inhibited, the access control unit 412 forms a message indicating inhibition, and transmits this message to the computer system 100.

Figure 6:
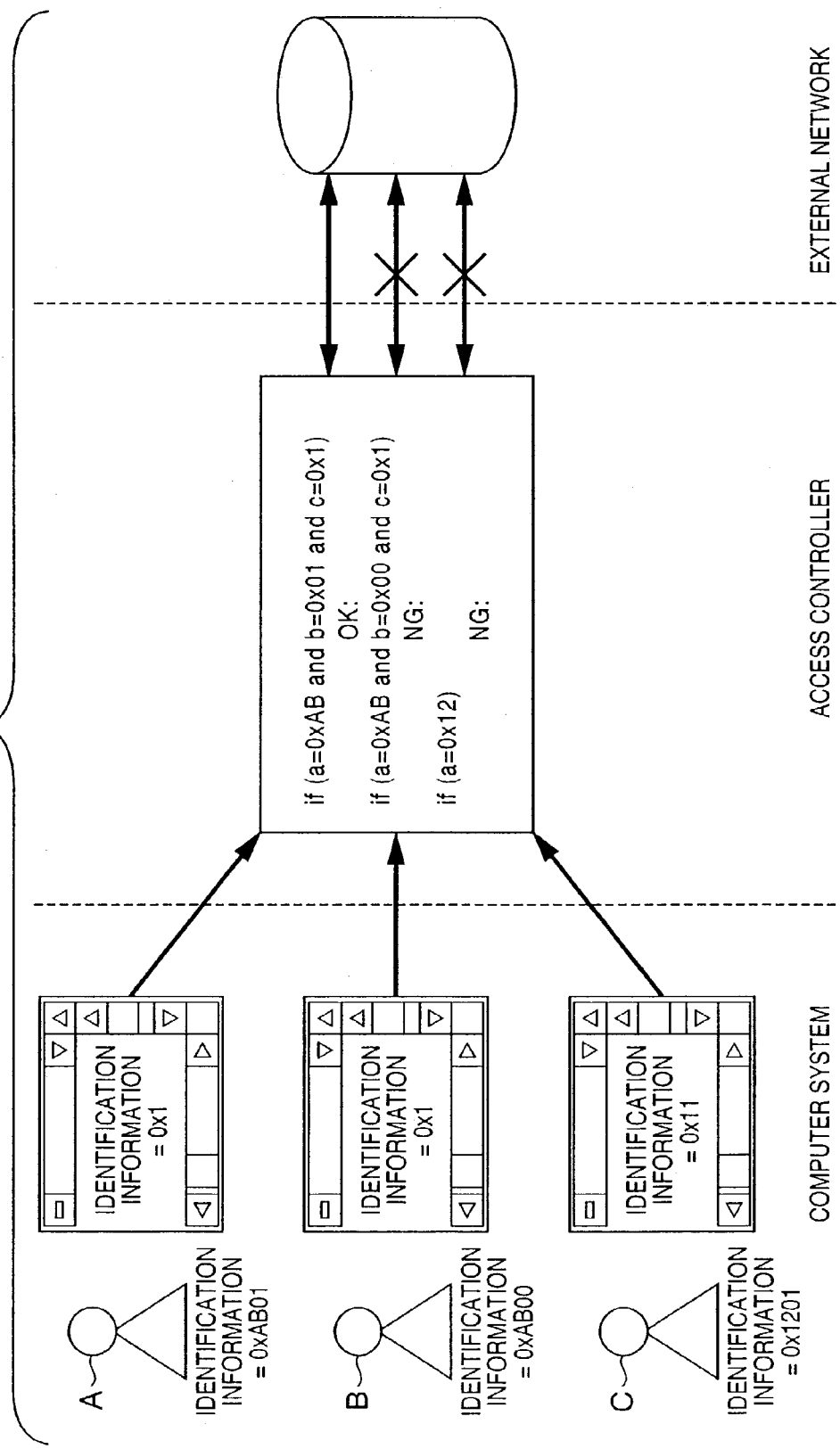
FIG. 6 is a conceptual view showing the state in which access control is performed by using the information processing system according to the embodiment of the present invention.

The flow of processing of this information processing system will be described in more detail below with reference to FIG. 6. FIG. 6 is a conceptual view showing the state in which access control is performed using the information processing system according to the embodiment of the present invention. Assume that users A, B, and C use the information processing system, and these users A, B, and C have pieces of identification information (user identification information) 0xAB01, 0xAB00, and 0x1201, respectively, for identifying between them. Assume also that pieces of identification information (application identification information) for identifying applications used by the users A, B, and C are 0x1, 0x1, and 0x11, respectively.

In addition, the user identification information is allocated to the 65th to 96th bits of a 128-bit IPv6 address, and the application identification information is allocated to the 97th to 128th bits of the address, thereby forming an aggregatable global unicast address. For example, an IP address transmitted from a computer used by the user A is as shown in FIG. 7. The 64 upper bits are, e.g., data acquired from a router.

Data obtained by adding the generated IP address to an IP header field is transmitted to the access controller 101. In the access controller 101, the access control unit 412 analyzes the transmitted data, and forms identification information from the IP address by using variables a, b, and c as the values of the 65th to 80th bits, 81st to 96th bits, and 97th to 128th bits, respectively, of the IP address.

If a rule which permits transfer when the variables a, b, and c are 0xAB, 0x1, and 0x1, respectively, is set in the access rule 411, only the user A is permitted to access in this assumed case.

The method of mapping the identification information of the user and application in an IP address, the method of constructing the identification information from the IP address, and the rule assumed herein are merely examples and used to simplify the explanation.

More precise control can of course be performed by setting finer IP addresses and applying finer rules.

In the present invention as described above, the computer system 100 includes the address binding unit 402 and binding list 401, and the access controller 101 includes the access control unit 412 and access rule 411. With respect to one network interface, different IP (Internet Protocol) addresses are given to individual users, individual applications, or both individual users and individual applications. In this way, appropriate precise access control can be performed when the individual users, individual applications, or both the individual users and individual applications access external resources such as the Internet.

Consequently, it is possible to limit inappropriate information on the Internet and prevent the inappropriate information from being read especially by children. It is also possible to prevent a productivity reduction caused by inappropriate access to Web sites during work time in enterprises and the like, and precisely set security management. This brings about a great advantage not only for users but also for the system manager.

Second Embodiment

In the first embodiment described above, identification information (identification information 1) of a user and identification information (identification information 2) of an application are mapped in an IP address, and access control is performed on the basis of this mapped IP address. This realizes precise access control for each user and each application. In the second embodiment, access control which also avoids an invasion of user's privacy will be explained.

That is, when user's identification information and application's identification information are mapped in an IP address to realize precise access control as in the first embodiment, these pieces of information may be abused to invade privacy. In this embodiment, therefore, means which, when user's identification information and application's identification information are to be mapped in an IP address, avoids these pieces of information from being abused to invade privacy will be described below.

More specifically, in place of an IEEE EUI-64 address generally used in an IPv6 address, a temporary address is used to map user's identification information and application's identification information. This makes it difficult to specify a node (a node is generally a device connected to a computer network and capable of designating an address; in FIG. 1, the computer system 100 connected to the network 102 via the address controller 101 is a node), thereby preventing the information from being misused to invade privacy. In an information processing system of this embodiment, access control is performed on the basis of user's identification information and application's identification information, and access permission and inhibition are switched in accordance with whether these pieces of information are mapped in a temporary address. That is, access is permitted only when these pieces of information are mapped in a temporary address which cannot be easily misused to invade privacy.

Prior to a detailed explanation of this embodiment, the IEEE EUI-64 format, a method of generating an IPv6 address, and an address duplication detecting method will be explained first, and then a temporary address used in this embodiment will be explained. Also, the mechanism of a data link layer will be described. Finally, details of access control in the information processing system according to this embodiment will be described.

<Explanation of IEEE EUI-64 Format>

Of the contents described in "R. Hinden, S. Deering, IPVersion6 Addressing Architecture, RFC2373, July 1998", a portion relevant to the present invention will be explained below. Details are described in RFC2373.

A typical IPv6 address is made up of a prefix and interface ID. The prefix uses 64 upper bits, and the interface ID uses 64 lower bits. The interface ID is generated as follows from 48 bits of a MAC address of an Ethernet interface.

Figure 9:
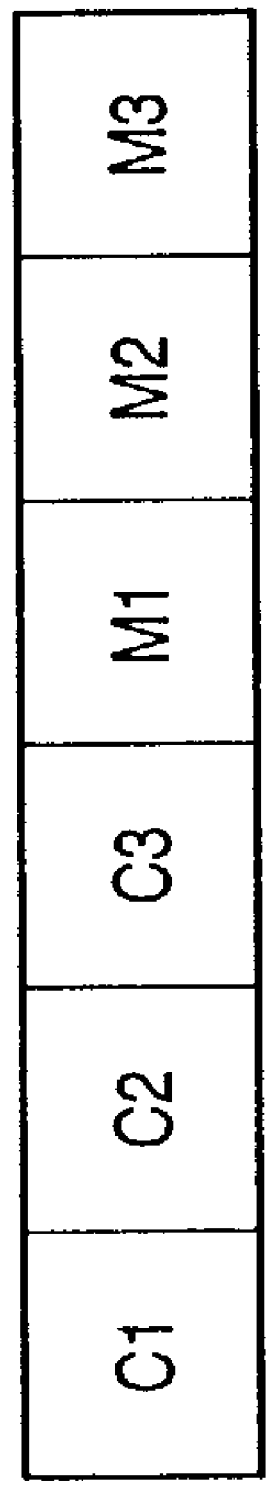
FIG. 9 is a view showing the arrangement of a MAC address of Ethernet.

An Ethernet IEEE identifier (MAC address) is a 6-byte address. The first three bytes are managed and allocated as a manufacturer vender code by IEEE. The remaining three bytes are managed by each vender and so allocated that no duplication takes place. FIG. 9 shows the arrangement of an Ethernet MAC address. Each rectangle indicates 1-byte (8-bit) data. The three left bytes indicate a manufacturer vender code, and the three remaining bytes indicate a code managed by a vender. This code managed by a vender differs from one Ethernet card to another. Therefore, the only address in the world corresponds to each Ethernet card and is used as an address when data is exchanged across Ethernet.

This Ethernet MAC address (FIG. 9) is divided into two 3-byte portions, a hexadecimal number "FFFE"is sandwiched between them, and the seventh bit from the start is set to 1. This is shown in FIG. 10.

Figure 10:
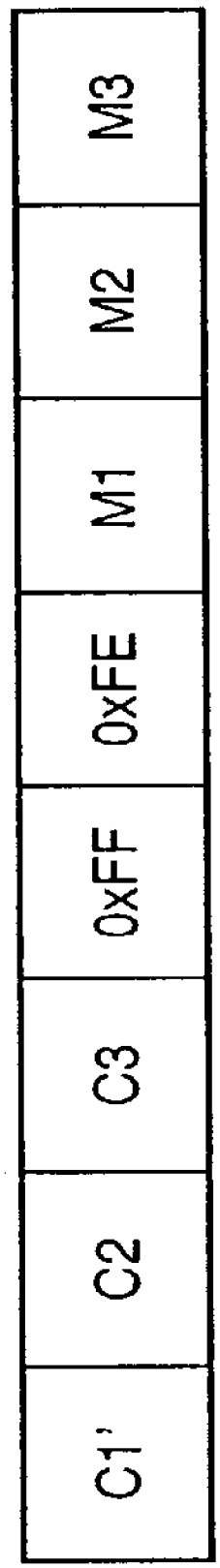
FIG. 10 is a view showing the arrangement of an interface ID.

In C1' shown in FIG. 10, the seventh bit from the start of C1 shown in FIG. 9 is set to 1. 64-bit data having the arrangement shown in FIG. 10 is called an IEEE EUI-64 interface ID.

<Explanation of IPv6 Address Generating Method & Address Duplication Detecting Method>

Figure 8:
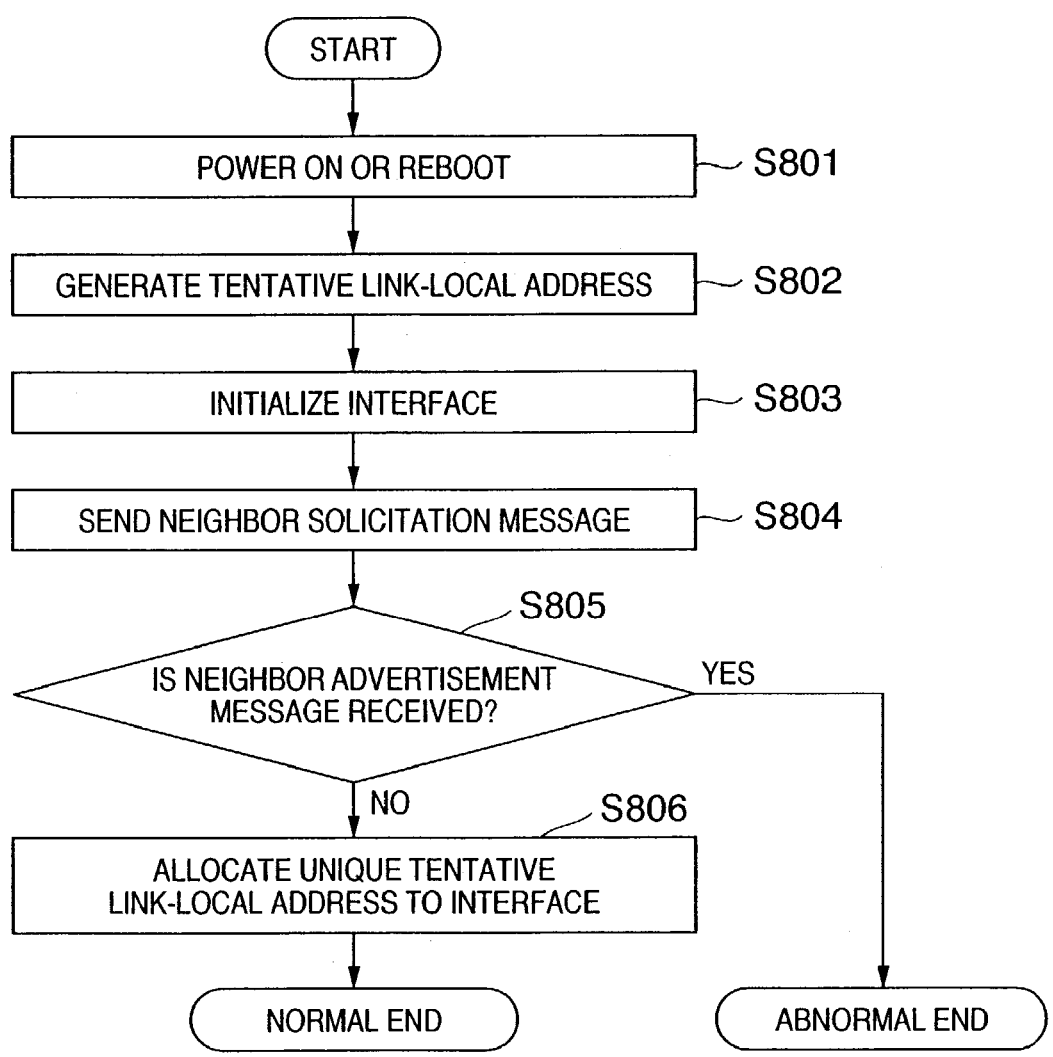
FIG. 8 is a flow chart showing the flow of a DAD process in the information processing system according to the embodiment of the present invention.

FIG. 8 shows an operation flow chart of an IPv6 address generating process performed when an IPv6 apparatus (an apparatus allocated with an IPv6 address; in the example shown in FIG. 1, the computer system 100 is an IPv6 apparatus) is powered on or rebooted, and an IPv6 address duplication detecting process performed after that. This duplication detecting process is called DAD (Duplicate Address Detection). The process contents will be explained below in accordance with the flow shown in FIG. 8.

In step S801, the IPv6 apparatus is powered on or rebooted. Since no address is allocated to the interface immediately after that, an interface ID (FIG. 10) is formed from the Ethernet MAC address (FIG. 9) by the method described above. In addition, 128-bit data (to be referred to as a tentative link-local address hereinafter) is formed by adding the interface ID to FE80:0000:0000:0000 of a link-local address prefix. The foregoing is processing in step S802. FIG. 11 shows the arrangement of this tentative link-local address.

Next, the IPv6 apparatus performs the following processing in order to determine whether the tentative local-link address is unique on the link. First, the interface is initialized. That is, an all-nodes multicast address (FF02::1) and a solicited-node multicast address of the tentative link-local address are allocated to the interface. That is, if this interface finds a packet addressed to the all-nodes multicast address or a packet addressed to the solicited-node multicast address of the tentative link-local address, the interface receives the packet as it is addressed to the interface. By allocating the former (all-nodes multicast address), data can be received from another node already using the tentative link-local address. By allocating the latter (the solicited-node multicast address of the tentative link-local address), the existence of another node which intends to use the same tentative link-local address at the same time can be detected. As defined in "RFC2461, page 91", a solicited-node multicast address of a certain tentative link-local address is data formed by adding the 24 lower bits of the tentative link-local address to a prefix FF02:0:0:0:0:1:FF00::/104, and is a link-local scope multicast address. FIGS. 11 and 12 illustrate the relationships between them. Address allocation described above is step S803 shown in FIG. 8.

After that, a neighbor solicitation message is formed. In this neighbor solicitation message, the tentative link-local address as an object to be determined is set in a target address, an unspecified address (all 128 bits are 0) is set in an IP source (transmission source address), and the solicited-node multicast address of the tentative link-local address as the object to be determined is set in an IP destination (destination address). Such neighbor solicitation messages equal in number to DupAddrDetectTransmits are sent to the Ethernet at intervals of RetransTimer milliseconds. Step S804 shown in FIG. 8 is this processing.

A node which has received the neighbor solicitation message can determine that the message is data from a node which is performing DAD, if the transmission source address is an unspecified address. If a plurality of nodes are performing DAD for the same address, duplication can be detected since a plurality of neighbor solicitation messages containing the same address in the target address are received. In this case, no node uses the address. If the received neighbor solicitation message is sent by itself (this occurs because multicast packets are looped back), the message does not indicate the existence of a node which is using or going to use this message.

On the other hand, if a node which has received the neighbor solicitation message has already used the address contained in the target address of the message, the node returns a multicast neighbor advertisement. Accordingly, if a node which has sent a neighbor solicitation message receives a multicast neighbor advertisement and the target address is the tentative address (of an object to be determined) (i.e., if "YES" in step S805 of FIG. 8), the tentative address of the object is not unique (i.e., duplicated).

If the tentative link-local address as the object to be determined is found to be unique on the link by the result of DAD described above (i.e., if "NO" in step S805 of FIG. 8), the address is allocated as a link-local address to the interface. This is step S806 shown in FIG. 8. In this way, DAD is complete. The operation explained above can be executed by each of the computer system 100 and access controller 101 shown in FIG. 1 (as an IPv6 apparatus).

<Temporary Address>

A temporary address will be described next. "T. Narten, R. Draves, Privacy Extensions for Stateless Address Autoconfiguration in IPv6, RFC3041" describes the problems of an IEEE EUI-64 address and a temporary address as a countermeasure. That is, since an IEEE EUI-64 interface ID generated from a MAC address of an Ethernet interface also functions as an ID for identifying an IPv6 apparatus, this interface ID can also be abused to invade privacy. Therefore, an invasion of privacy is prevented by generating different interface IDs for certain predetermined periods and using these IDs.

Unlike the method of forming an interface ID (FIG. 10) from the Ethernet MAC address (FIG. 9) described above, a temporary address formation method uses MD5 message digest. MD5 is a function which receives 128 bits and outputs 128 bits. The 128 input bits are formed by 64 upper bits and 64 lower bits as follows. The interface ID uses the 64 upper bits. 64 random bits generated by a certain method or the 64 lower bits of the calculation result of the last MD5 are used as the 64 lower bits of the 128 input bits. The MD5 message digest is calculated by inputting these 128 bits, and the 64 upper bits are extracted from 128 bits as the calculation result. 64 bits in which the seventh bit from the left of the 64 extracted bits is set to zero are used as the interface ID. The 64 lower bits of the calculation result are so recorded as to be used in calculation of the next MD5.

Different interface IDs are generated for certain periods in accordance with the above generation method (i.e., the interface ID has an attribute which changes for each predetermined period), and these interface IDs are used as global addresses. In this case, it is difficult to identify the node, unlike when an address formed by the IEEE EUI-64 format is used. This effectively prevents an invasion of privacy.

<Explanation of Data Link Layer>

The mechanism of a data link layer will be described below. In the case of Ethernet, a data link layer positioned below an IP layer is communicated by packet communication which uses a MAC address of an Ethernet interface as an identifier. Accordingly, if information of a data link layer and IP layer of a certain IPv6 apparatus is available, it is possible to determine whether an IPv6 address used by this IPv6 apparatus is formed by the IEEE EUI-64 format. If this address is not formed by the IEEE EUI-64 format and the seventh bit from the left is 1, the address may be a temporary address.

<Access Control>

Figure 13:
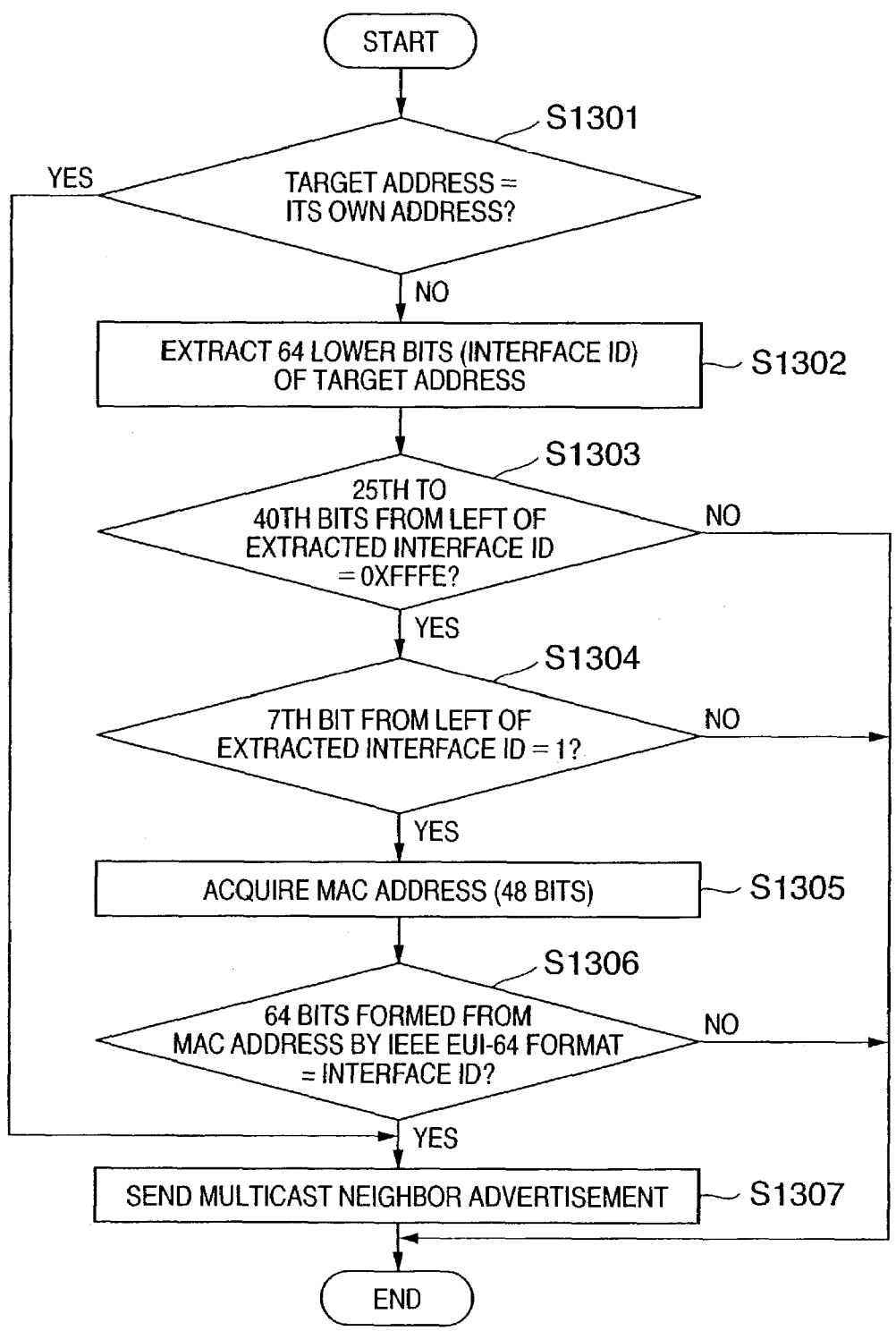
FIG. 13 is a flow chart showing the flow of processing in the information processing apparatus according to the embodiment of the present invention.

The operation of the information processing system according to this embodiment including the access rule using the foregoing will be described below with reference to FIG. 13.

In step S1301, an IPv6 apparatus which has received a neighbor solicitation message by DAD extracts a target address and determines whether the extracted target address matches the address of the IPv6 apparatus. If YES in step S1301, the flow advances to step S1307. If NO in step S1302, the flow advances to step S1302.

In step S1302, the 64 lower bits (interface ID) of the target address are extracted.

In step S1303, whether the 25th to 40th bits from the left of the extracted interface ID are 0xFFFE is determined. If these bits are 0xFFFE, the processing is complete; if not, the flow advances to step S1304.

In step S1304, whether the seventh bit from the left of the interface ID is 1 is determined. If the seventh bit is not 1, the processing is complete. If the seventh bit is 1, the flow advances to step S1305.

In step S1305, a transmission source MAC address of an Ethernet packet containing the neighbor solicitation message is extracted.

In step S1306, whether 64-bit data generated from the transmission source MAC address by the IEEE EUI-64 formate matches the interface ID extracted in step S1302 is determined. If YES in step S1306, the flow advances to step S1307. If NO in step S1306, the processing is complete.

In step S1307, a multicast neighbor advertisement is sent.

When the above processing is performed, an IPv6 apparatus which intends to use an interface ID generated by the IEEE EUI-64 format receives the multicast neighbor advertisement. Therefore, this IPv6 apparatus cannot use the interface ID. However, the IPv6 apparatus can use an interface ID different from the interface ID generated by the IEEE EUI-64 format. This allows the IPv6 apparatus to use an IPv6 address (address equivalent to an anonymous address) which cannot be easily misused to invade privacy.

Figure 14:
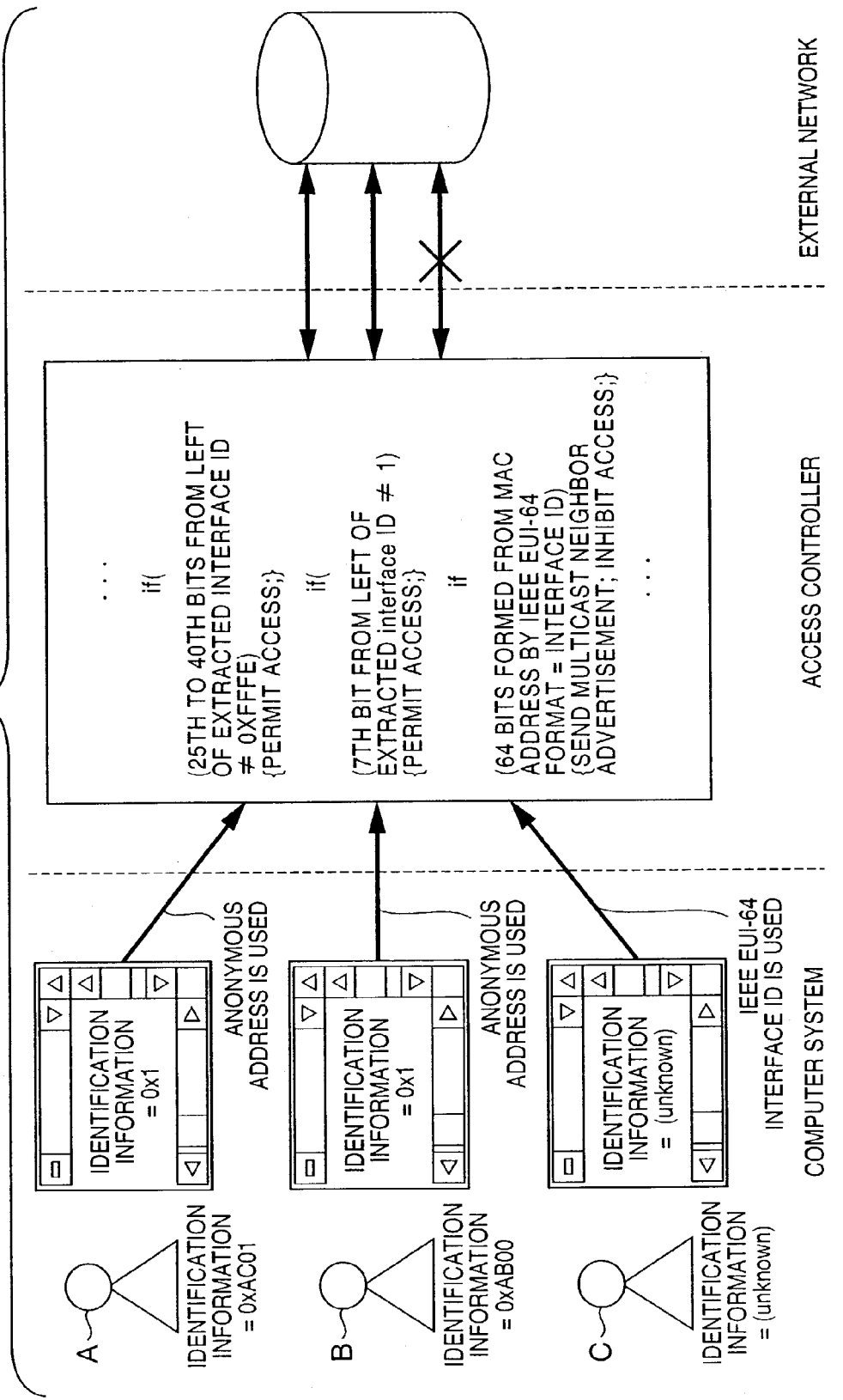
FIG. 14 is a conceptual view showing the state in which access control is performed in the information processing system according to the embodiment of the present invention.

A practical example of this embodiment will be explained below with reference to FIG. 14. In FIG. 14, if identification information is allocated to each of a user and application, the user's identification information is allocated to the 65th to 96th bits of a 128-bit IPv6 address, and the application's identification information is allocated to the 97th to 128th bits of the address. If identification information is not allocated to each of a user and application, an interface ID generated from a MAC address by the IEEE EUI-64 format is allocated to the 65th to 128th bits of an IPv6 address. The system operates on the basis of this setting.

Referring to FIG. 14, pieces of identification information of users A, B, and C at a certain time are 0xAC01, 0xAB00, and undefined, respectively, and pieces of identification information of applications used by the users A, B, and C are 0x1, 0x11, and undefined, respectively. For each of the users A and B, the 25th to 40th bits from the left of the interface ID are not 0xFFFE. Therefore, no multicast neighbor advertisement is sent as shown in the flow chart of FIG. 13, so access from the users A and B is permitted. That is, since the 65th to 128th bits from the left of this address are not an interface ID formed by the IEEE EUI-64 format, access to an external network can be performed by using an address equivalent to an anonymous address. On the other hand, the user C accesses an external network by using an interface ID formed by the IEEE EUI-64 format, so a multicast neighbor advertisement is sent to inhibit this access. As a consequence, this interface ID is not abused to invade privacy. By changing identification information with time, the degree of privacy protection can be increased.

The method of mapping identification information of a user and application in an IP address and the method and rule for constructing the identification information from the IP address herein assumed are examples and used to simplify the explanation. It is evidently also possible to perform more precise control by applying the setting and rule of another IPv6 address.

In contrast to the above processing, an access rule which uses only an interface ID generated by the IEEE EUI-64 format can also be realized. That is, in step S1306, whether the 64-bit data generated from the transmission source MAC address by the IEEE EUI-64 format matches the interface ID extracted in step S1302 is determined. If NO in step S1306, the flow advances to step S1307. If YES in step S1306, the processing is complete. When this process is executed, an IPv6 apparatus which intends to use an interface ID which is not generated by the IEEE EUI-64 format receives a multicast neighbor advertisement. Therefore, this interface ID cannot be used, but an interface ID generated by the IEEE EUI-64 format can be used. Accordingly, when this access rule is applied, only an IPv6 address containing an interface ID formed by the IEEE EUI-64 format can be used.

As is apparent from the above description, this embodiment performs access control which applies an access rule by which a network address generated by a specific method is always used or never used. This makes it difficult to identify the computer system, thereby preventing an invasion of privacy. In addition, precise access control appropriate for a user can be performed without his or her knowing it.

That is, it is possible to limit inappropriate information on the Internet and the like, and protect particularly children from these pieces of information. In addition, it is possible to prevent a productivity reduction caused by personal use by inappropriate access to Web sites during work time in enterprises and the like. Also, an invasion of privacy can be prevented by preventing a fixed interface ID of a computer system from being known by a third party.

Furthermore, it is possible to reduce security risk for preventing intentional privacy invasion, and perform precise access control without any large load on users. This brings about a great advantage not only for users but also for the system manager.

Third Embodiment

In this embodiment, an example of access control combining the second embodiment described above and an encryption/authentication function will be explained. Although IPsec is taken as an example of the encryption/authentication function, the function is not limited to IPsec, and another encryption/authentication function can also be used.

This embodiment will be described below by taking a configuration including a computer system 100 and access controller 101 shown in FIG. 1 as an example. IPsec has a tunnel mode and transport mode. In the tunnel mode, a path for adding data which can encrypt or authenticate communication data is present midway along a path which connects two apparatuses communicating with each other. That is, in this tunnel mode, a midway section of the path functions as a tunnel which conceals communication data (when the data is to be encrypted). Apparatuses at the two ends of the tunnel section and two apparatuses communicating with each other are not necessarily different. That is, while one end of the tunnel section also functions as one communication apparatus, the other end of the tunnel section may not. Details are described in "S. Kent, R. Atkinson, Security Architecture for the Internet Protocol, RFC2401, November 1998".

An application example of the tunnel mode in the form explained above will be described below. Assume that when the computer system 100 shown in FIG. 1 communicates with a certain apparatus on the network, the access controller 101 functions as one end of the tunnel, and the apparatus as a communication partner also functions as the other end of the tunnel.

In the access controller 101, the IP address and IPsec (e.g., a port, AH, ESP, tunnel mode, pre-shared key, or certificate) of the communication partner are set.

In this embodiment, data between the communication partner and the access controller 101 is always encrypted by ESP.

In addition, the access rule explained in the second embodiment which uses an IPv6 address which is not easily misused to invade privacy is set in the access controller 101.

When the user of the computer system 100 is to communicate with the communication partner, e.g., access the communication partner by using a browser while the above settings are done, data encrypted by ESP is exchanged midway along the path by using an IPv6 address which is hardly abused to invade privacy. In this communication, no IPv6 address containing an interface ID formed by the IEEE EUI-64 format is used, and no unencrypted communication data is exchanged with the communication partner.

Accordingly, even when the user of the computer system 100 is not familiar to computers, he or she can communicate with the communication partner without performing any complicated settings, while the data is encrypted using an IPv6 address with which privacy can be protected. In addition, even if only an interface ID formed by the IEEE EUI-64 format can be used because of a user's careless operation or of a failure of the computer 100, the access controller 101 performs access control so as not to communicate with the communication partner. Consequently, an invasion of privacy or information leak caused by an accident can also be prevented.

Furthermore, even if the user of the computer 100 knows well about computers and tries to intentionally invade privacy or leak information, this invasion of privacy or information leak can be prevented.

An example using the same configuration but a different combination is as follows. That is, the access controller 101 uses an access rule by which an IPv6 address containing an IEEE EUI-64 interface ID is always used. In addition, the access controller 101 executes ESP as one end of the IPsec tunnel mode, and the computer system 100 communicates with a communication partner by using AH in the IPsec transport mode. In this case, for example, the site of the manufacturer of the computer system 100 is the communication partner. That is, the computer system 100 is sold after a pre-shared key used in AH of IPsec is set beforehand, and the MAC address of the computer system is also recorded. This example can be used as access control to realize safe and reliable access from a customer. It is of course also possible to practice other combinations by the same configuration.

In this embodiment, as can be seen from the above explanation, communication data can be encrypted or authenticated by using the encryption/authentication function. Consequently, precise access control appropriate for a user can be performed without his or her knowing it.

That is, it is possible to limit inappropriate information on the Internet and the like, and protect particularly children from these pieces of information. In addition, it is possible to prevent a productivity reduction caused by personal use by inappropriate access to Web sites during work time in enterprises and the like. Also, a leak of information can be avoided by preventing a fixed interface ID of a computer system from being communicated without being encrypted.

Furthermore, since an intentional information leak can also be prevented, it is possible to reduce security risk, and perform precise access control without any large load on users. This brings about a great advantage not only for users but also for the system manager.

Fourth Embodiment

In this embodiment, an example of an access control system combining the first embodiment described earlier and an encryption/authentication function will be explained. Although SSL (Secure Sockets Layer) is taken as an example of the encryption/authentication function, this function is not limited to SSL, and another encryption/authentication function can also be used.

The fourth embodiment will be described below by taking a configuration including a computer system 100 and access controller 101 shown in FIG. 1, and FIG. 6 as examples. When SSL is used, data between a Web site on a network 102 shown in FIG. 1 and the computer system 100 can be encrypted, and the computer system 100 can confirm the identity of the Web site.

As described in the first embodiment, users A, B, and C exist in FIG. 6, pieces of identification information of the users A, B, and C are 0xAC01, 0xAC00, and 0x1201, respectively, and pieces of identification information of applications used by the users A, B, and C are 0x1, 0x1, and 0x11, respectively.

Each of these pieces of user identification information is allocated to the 65th to 96th bits of a 128-bit IPv6 address, and the corresponding application identification information is allocated to the 97th to 128th bits of the address, thereby forming an aggregatable global unicast address.

For example, an IP address transmitted from a computer used by the user A is as shown in FIG. 7. The 64 upper bits are, e.g., data acquired from a router. An access control unit 412 analyzes the transmitted data, and forms identification information from the IP address by using variables a, b, and c as the values of the 65th to 80th bits, 81st to 96th bits, and 97th to 128th bits, respectively, of the IP address. If a rule which permits communication by SSL when the variables a, b, and c are 0xAC, 0x1, and 0x1, respectively, is set in the access rule, only the user A can communicate by SSL. As already described in the first embodiment, it is also possible to set "inhibition" instead of "permission", and change this setting for each application. Therefore, these combinations can of course be applied as the access rule.

In the present invention as has been described above, appropriate precise access control can be performed.

The present invention is not limited to the above embodiments and various changes and modifications can be made within the spirit and scope of the present invention. Therefore, to apprise the public of the scope of the present invention, the following claims are made.

What is claimed is:

1. An information processing system comprising a connecting device capable of data transmission/reception, and an information processing apparatus connectable to a network via said connecting device, wherein
said information processing apparatus comprises:
acquiring means for acquiring user identification information for identifying a user, and application identification information for identifying an application which accesses said network; and
adding means for generating an IP address based on both the acquired user identification information and the acquired application identification information, and adding the generated IP address to data to be transmitted via said application, wherein the acquired user identification information is allocated to a first part of the generated IP address and the acquired application identification information is allocated to a second part of the generated IP address; and
said connecting device comprises access control means for controlling access to said network on the basis of the IP address added to the transmitted data.

2. The system according to claim 1, wherein said information processing apparatus further comprises a bind list storage means storing a bind list describing user identification information, which is determined for each input user ID, and application identification information determined for each application, and
said acquiring means acquires the user identification information and application identification information on the basis of said bind list.

3. The system according to claim 2, wherein said information processing apparatus further comprises means for searching and changing said bind list.

4. The system according to claim 1, wherein said connecting device further comprises a rule for access control, and said access control means performs a determination on the basis of said rule.

5. The system according to claim 4, wherein said connecting device further comprises means for searching and changing said rule.

6. The system according to claim 4, wherein, if said connecting device determines on the basis of said rule that data transmitted from said information processing apparatus should not to be transmitted to said network, said connecting device transmits a message indicating transmission inhibition to said information processing apparatus.

7. The system according to claim 1, wherein the IP address is added to the data by IPv6 serving as an Internet protocol.

8. The system according to claim 1, wherein said application is a network browser.

9. An information processing apparatus connectable to a network via a connecting device capable of access control on the basis of an IP address added to received data, comprising:
acquiring means for acquiring user identification information for identifying a user, and application identification information for identifying an application which accesses said network; and
adding means for generating an IP address based on both the acquired user identification information and the acquired application identification information, and adding the generated IP address to data to be transmitted via said application,
wherein the acquired user identification information is allocated to a first part of the generated IP address and the acquired application identification information is allocated to a second part of the generated IP address.

10. The apparatus according to claim 9, further comprising a bind list storage means storing a bind list describing user identification information, which is determined for each input user ID, and application identification information determined for each application, and
wherein said acquiring means acquires the user identification information and application identification information on the basis of said bind list.

11. The apparatus according to claim 10, further comprising means for searching and changing said bind list.

12. The apparatus according to claim 9, wherein the IP address is added to the data by IPv6 serving as an Internet protocol.

13. The apparatus according to claim 9, wherein said application is a network browser.

14. A connecting device for connecting an information processing apparatus capable of data transmission/reception to a network, comprising:
acquiring means for acquiring an IP address which is added to data transmitted from said information processing apparatus to identify both a user who has transmitted the data and an application used to transmit the data, wherein user identification information is allocated to a first part of the IP address, and application identification information is allocated to a second part of the IP address; and
access control means for controlling access to said network on the basis of the acquired IP address.

15. The device according to claim 14, wherein the device further comprises a rule for access control, and said access control means performs a determination on the basis of said rule.

16. The device according to claim 15, further comprising means for searching and changing said rule.

17. The device according to claim 15, wherein, if it is determined on the basis of said rule that data transmitted from said information processing apparatus should not to be transmitted to said network, a message indicating transmission inhibition is transmitted to said information processing apparatus.

18. An information processing method for an information processing apparatus connectable to a network via a connecting device capable of access control on the basis of an IP address added to received data, comprising:

an acquisition step of acquiring user identification information for identifying a user, and application identification information for identifying an application which accesses the network; and an addition step of generating an IP address based on both the acquired user identification information and the acquired application identification information, and adding the generated IP address to data to be transmitted via the application, wherein the acquired user identification information is allocated to a first part of the generated IP address and the acquired application identification information is allocated to a second part of the generated IP address.

19. The method according to claim 18, wherein the method further comprises storing a bind list describing user identification information, which is determined for each input user ID, and application identification information determined for each application, and in the acquisition step, the user identification information and application identification information are acquired on the basis of the bind list.

20. The method according to claim 19, further comprising a step of searching and changing the bind list.

21. The method according to claim 18, wherein the IP address is added to the data by IPv6 serving as an Internet protocol.

22. The method according to claim 18, wherein the application is a network browser.

23. An information processing method for a connecting device for connecting an information processing apparatus capable of data transmission/reception to a network, comprising:

an acquisition step of acquiring an IP address which is added to data transmitted from the information processing apparatus to identify both a user who has transmitted the data and an application used to transmit the data, wherein user identification information is allocated to a first part of the IP address, and application identification information is allocated to a second part of the IP address; and an access control step of controlling access to the network on the basis of the acquired IP address.

24. The method according to claim 23, wherein the access control step further comprises a rule for access control, and in the access control step, a determination is performed on the basis of the rule.

25. The method according to claim 23, further comprising a step of searching and changing the rule.

26. The method according to claim 23, wherein, if it is determined on the basis of the rule that data transmitted from the information processing apparatus should not to be transmitted to the network, a message indicating transmission inhibition is transmitted to the information processing apparatus.

27. A computer-readable storage medium on which is stored computer executable code for a control program which allows a computer to implement the information processing method according to claim 18.

28. A computer-readable storage medium on which is stored computer-executable code for a control program which allows a computer to implement the information processing method according to claim 23.

29. An information processing system comprising a connecting device capable of data transmission/reception, and an information processing apparatus connectable to a network via said connecting device, wherein said information processing apparatus comprises:

acquiring means for acquiring user identification information for identifying a user, and application identification information for identifying an application which accesses said network; and adding means for generating an IP address based on both the acquired user identification information and the acquired application identification information, and adding the IP address to data to be transmitted via said application, wherein the acquired user identification information and the acquired application identification information are allocated to each part of the generated IP address when identification information is allocated to each of the user and the application, and wherein a temporary IP address is used as the generated IP address when identification information is not allocated for each of the user and the application, and said connecting device comprises:

determining means for determining an attribute of the IP address added to the data transmitted from the information processing apparatus;

recognizing means for recognizing the user identification information and the application identification information by analyzing the IP address added to the transmitted data; and access control means for controlling access to said network on the basis of the IP address attribute and the recognized user identification information and the recognized application identification information.

30. The system according to claim 29, wherein said adding means generates an IP address having an attribute which changes for each predetermined period.

31. The system according to claim 29, wherein said adding means generates the IP address by using a temporary address of IPv6 serving as an Internet protocol.

32. The system according to claim 29, wherein, if said determining means determines that the IP address has no attribute which changes for each predetermined period, said access control means does not access said network.

33. The system according to claim 29, wherein, if said determining means determines that the IP address is not generated by using a temporary address of IPv6 serving as an Internet protocol, said access control means does not access said network.

34. The system according to claim 29, wherein said information processing apparatus further comprises a bind list storage means that stores a bind list describing an input user ID and the user identification information related to each other and an application and the application identification information related to each other, and said acquiring means acquires the user identification information and application identification information from an input user ID and application on the basis of said bind list.

35. The system according to claim 34, wherein said information processing apparatus further comprises means for searching and changing said bind list.

36. The system according to claim 29, wherein said connecting device comprises a rule of access control for the IP address attribute and the user identification information and application identification information, and said access control means performs a determination on the basis of said rule.

37. The system according to claim 36, wherein said connecting device further comprises means for searching and changing said rule.

38. The system according to claim 29, wherein, if said access control means limits access to said network, said connecting device transmits a predetermined message to said information processing apparatus.

39. An information processing apparatus connectable to a network via a connecting device capable of access control on the basis of an IP address added to received data, comprising:

acquiring means for acquiring user identification information for identifying a user, and application identification information for identifying an application which accesses said network; and adding means for generating an IP address having an attribute which changes for each predetermined period, based on both the acquired user identification information and the acquired application identification information, and adding the generated IP address to data to be transmitted via said application, wherein the acquired user identification information and the acquired application identification information are allocated to each part of the generated IP address when identification information is allocated to each of the user and the application, and wherein a temporary IP address is used as the generated IP address when identification information is not allocated to each of the user and the application.

40. The apparatus according to claim 39, wherein the apparatus further comprises a bind list storage means that stores a bind list describing an input user ID and the user identification information related to each other and an application and the application identification information related to each other, and said acquiring means acquires the user identification information and application identification information from an input user ID and application on the basis of said bind list.

41. The apparatus according to claim 40, further comprising means for searching and changing said bind list.

42. A connecting device for connecting an information processing apparatus capable of data transmission/reception to a network, comprising:

determining means for determining an attribute of an IP address added to data transmitted from said information processing apparatus, wherein the user identification information and the application identification information are allocated to each part of the IP address when identification information is allocated to each of a user and an application, and wherein a temporary IP address is used as the IP address when identification information is not allocated to each of the user and the application;

recognizing means for recognizing the user identification information for identifying the user and the application identification information for identifying the application which accesses said network by analyzing the IP address added to the transmitted data; and access control means for controlling access to said network on the basis of the IP address attribute and the recognized user identification information and the recognized application identification information.

43. The device according to claim 42, wherein, if said determining means determines that the IP address has no attribute which changes for each predetermined period, said access control means does not access said network.

44. The device according to claim 42, wherein, if said determining means determines that the IP address is not generated by using a temporary address of IPv6 serving as an Internet protocol, said access control means does not access said network.

45. The device according to claim 42, wherein the device further comprises a rule of access control for the IP address attribute and the user identification information and application identification information, and said access control means performs determination on the basis of said rule.

46. The device according to claim 45, further comprising means for searching and changing said rule.

47. The device according to claim 42, wherein, if said access control means limits access to said network, a predetermined message is transmitted to said information processing apparatus.

48. An information processing method for an information processing apparatus connectable to a network via a connecting device capable of access control on the basis of an IP address added to received data, comprising:

an acquisition step of acquiring user identification information for identifying a user, and application identification information for identifying an application which accesses the network; and an addition step of generating an IP address having an attribute which changes for each predetermined period, based on both the acquired user identification information and the acquired application identification information, and adding the generated IP address to data to be transmitted via the application, wherein the acquired user identification information and the acquired application identification information are allocated to each part of the generated IP address when identification information is allocated to each of the user and the application, and wherein a temporary IP address is used as the generated IP address when identification information is not allocated to each of the user and the application.

49. The method according to claim 48, wherein the method further comprises storing a bind list describing an input user ID and the user identification information related to each other and an application and the application identification information related to each other, and in the acquisition step, the user identification information and application identification information from an input user ID and application are acquired on the basis of the bind list.

50. The method according to claim 49, further comprising a step of searching and changing the bind list.

51. An information processing method for a connecting device for connecting an information processing apparatus capable of data transmission/reception to a network, comprising:

a determination step of determining an attribute of an IP address added to data transmitted from the information processing apparatus, wherein user identification information and application identification information are allocated to each part of the IP address when identification information is allocated to each of a user and an application, and wherein a temporary IP address is used as the IP address when identification information is not allocated to each of the user and the application;

a recognition step of recognizing the user identification information for identifying the user and recognizing the application identification information for identifying the application which accesses the network by analyzing the IP address added to the transmitted data; and an access control step of controlling access to the network on the basis of the IP address attribute and the recognized user identification information and application identification information.

52. The method according to claim 51, wherein, if it is determined in the determination step that the IP address has no attribute which changes for each predetermined period, the network is not accessed.

53. The method according to claim 51, wherein, if it is determined in the determination step that the IP address is not generated by using a temporary address of IPv6 serving as an Internet protocol, the network is not accessed.

54. The method according to claim 51, wherein the access control step further comprises a rule of access control for the IP address attribute and the user identification information and application identification information, and in the access control step, determination is performed on the basis of the rule.

55. The method according to claim 54, further comprising a step of searching and changing the rule.

56. The method according to claim 51, wherein, if access to the network is limited in the access control step, a predetermined message is transmitted to the information processing apparatus.

57. A computer-readable storage medium on which is stored computer-executable code for a control program which allows a computer to implement the information processing method according to claim 48.

58. A computer-readable storage medium on which is stored computer-executable code for a control program which allows a computer to implement the information processing method according to claim 51.

* * * * *

UNITED STATES PATENT AND TRADEMARK OFFICE
CERTIFICATE OF CORRECTION

| | |
|---|---|
| PATENT NO. | : 7,376,745 B2 |
| APPLICATION NO. | : 10/435464 |
| DATED | : May 20, 2008 |
| INVENTOR(S) | : Shitano et al. |

It is certified that error appears in the above-identified patent and that said Letters Patent is hereby corrected as shown below:

<u>COLUMN 1</u>:
        Line 10, "(hereinafter)" should read -- hereinafter. --;
        Line 58, "comprises" should read -- comprises: --; and
        Line 61, "application." should read -- application --.

<u>COLUMN 2</u>:
        Line 10, "comprising" should read -- comprising: --; and
        Line 24, "comprising" should read -- comprising: --.

<u>COLUMN 4</u>:
        Line 19, "shows" should read -- show --;
        Line 37, "trademark)" should read -- trademark). --; and
        Line 51, "compute system 100," should read -- computer system 100, --.

<u>COLUMN 5</u>:
        Line 24, "are" should read -- being --;
        Line 43, "in to" should read -- into --; and
        Line 45, "search" should read -- a search --.

<u>COLUMN 6</u>:
        Line 21, "in to" should read -- into --;
        Line 35, "in to" should read -- into --; and
        Line 48, "in to" should read -- into --.

<u>COLUMN 8</u>:
        Line 16, "system" should read -- systems --; and
        Line 35, "avoids" should read -- avoid --.

<u>COLUMN 11</u>:
        Line 53, "formate" should read -- format --.

<u>COLUMN 13</u>:
        Line 5, "system" should read -- systems --.

<u>COLUMN 14</u>:
        Line 41, "system" should read -- systems --.

<u>COLUMN 16</u>:
        Line 62, "to" should be deleted.

UNITED STATES PATENT AND TRADEMARK OFFICE
CERTIFICATE OF CORRECTION

| | |
|---|---|
| PATENT NO. | : 7,376,745 B2 |
| APPLICATION NO. | : 10/435464 |
| DATED | : May 20, 2008 |
| INVENTOR(S) | : Shitano et al. |

It is certified that error appears in the above-identified patent and that said Letters Patent is hereby corrected as shown below:

<u>COLUMN 17</u>:
      Line 53, "to" should be deleted.

Signed and Sealed this

Twenty-first Day of October, 2008

JON W. DUDAS
*Director of the United States Patent and Trademark Office*